(12) United States Patent
Weinhofer

(10) Patent No.: US 6,442,442 B1
(45) Date of Patent: Aug. 27, 2002

(54) SYSTEM LEVEL DATA FLOW PROGRAMMING INTERFACE FOR A MULTI-AXIS INDUSTRIAL CONTROL SYSTEM

(75) Inventor: Juergen K. Weinhofer, Chagrin Falls, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 09/408,636

(22) Filed: Sep. 30, 1999

(51) Int. Cl.[7] .......................... G05B 19/42; G06F 19/00
(52) U.S. Cl. ........................ 700/86; 700/18; 700/83; 700/180; 700/181; 318/568.1; 345/967
(58) Field of Search .............................. 700/18, 17, 83, 700/86, 87, 180, 181; 345/349, 965, 964, 967; 318/567, 568.1

(56) References Cited

U.S. PATENT DOCUMENTS

| | | | | |
|---|---|---|---|---|
| 5,784,275 A | * | 7/1998 | Sojoodi et al. | 364/191 |
| 5,847,953 A | * | 12/1998 | Sojoodi et al. | 364/188 |
| 5,920,479 A | * | 7/1999 | Sojoodi et al. | 364/191 |
| 6,236,399 B1 | * | 5/2001 | Nishiyama et al. | 345/349 |
| 6,243,861 B1 | * | 6/2001 | Nitta et al. | 717/3 |

* cited by examiner

*Primary Examiner*—Paul P. Gordon
(74) *Attorney, Agent, or Firm*—David G. Luettgen; Alexander M. Gerasimow; William R. Walbrun

(57) ABSTRACT

An industrial control system comprises a first motion control system including a first motor and a first motion controller, a second motion control system including a second motor and a second motion controller, and a user program. The user program is executable by the industrial control system to control the first and second motion control systems. When the user program is displayed to a user, the user program comprises the following graphical elements. In particular, the user program includes a first icon which represents the first motion control system, a second icon which represents the second motion control system, and a third icon which represents a physical relationship between the first and second motion control systems. Finally, also displayed to the user is a plurality of data flow lines that connect the first, second, and third icons and that represent a flow of data between the icons. The various icons are all preferably implemented in an object-oriented programming environment.

24 Claims, 7 Drawing Sheets

SYSTEM LEVEL DATA FLOW PROGRAMMING INTERFACE FOR A MULTI-AXIS INDUSTRIAL CONTROL SYSTEM

BACKGROUND OF THE INVENTION

1. Field of the Invention

This invention relates to programming interfaces for industrial control systems. In a particularly preferred embodiment, this invention relates to a programming interface for an industrial control system in which the control system comprises multiple motion control axes, and in which the programming interface graphically provides the user with data flow information pertaining to the physical relationship between the various motion control axes.

2. Description of Related Art

Industrial control systems are used in a wide variety of operations such as manufacturing, processing, packaging and so on. Typically, an industrial control system comprises one or more industrial controllers, such as programmable controllers, which control a plurality of output devices based on input status information from a plurality of input devices.

In a multi-axis industrial control system, the industrial control system also comprises multiple motion control axes. Each motion control axis comprises a motion control system that may include for example a motion controller, a servo drive and an electric motor. Like the other output devices, the various motors of the motion control axes are controlled based on input status information from the plurality of input devices. The motion control axes are controlled in coordinated fashion such that various activities occur in synchronism as required by the controlled process.

Each motion controller is connected to a respective one of the servo drives that is in turn connected to a respective one of the motors. In combination, the motion controller and the servo drive implement a position feedback control loop, a velocity feedback control loop that is nested within the position feedback control loop, and a torque/current control loop that is nested with the velocity feedback control loop. (Because torque and current are proportional, the same loop can be viewed as either a torque control loop or a current control loop.) In combination, the motion controller and the servo drive are capable of accepting a position command and in response generating current to drive the motor and thereby to control the motor to obtain the commanded position. Motion controllers may for example be provided in the form of modules for a programmable controller system or as PC-based expansion cards or stand-alone units that communicate with the programmable controller system via a network communication link. Servo drives are usually provided as stand-alone units or are integrated with stand-alone motion controllers.

Industrial control systems typically operate based on execution of a user program that is tailored to the industrial control system and its intended use. The user program may be executed in the processor module of the industrial controller, or distributed computing techniques may be utilized such that the user program (which may comprise multiple subprograms) is executed both at the processor module and at the motion controllers. In an industrial control system with multiple industrial controllers, the user program may also be executed at the other industrial controllers and any additional motion controllers associated with the other industrial controllers.

Conventionally, industrial control systems have been programmed using sequential programming languages, such as ladder logic languages. Typically, with a windows-based sequential programming interface, the user program is graphically displayed in the form of a series of commands that are executed sequentially. For example, during programming, the user may drag and drop a timer icon and a move icon into the user program. When the user clicks on the timer icon, a dialog box appears that allows the user to program the timer for a specified period of time. Likewise, when the user clicks on the move icon, a dialog box appears that allows the user to program the parameters of the move, such as the final position, the maximum velocity, and so on. The user may then connect timer icon and the move icon with a connection line to indicate that, after the timer icon is executed, the move icon should be executed. Thus, the way in which the program is organized on the screen is indicative of the sequence of events that is programmed to occur.

When a move or other motion command is executed, the position control loop is provided with incremental reference position information to control the motor to obtain the commanded position. In practice, the position reference values may be provided every few milliseconds or so in the form of delta position information (change in position since the last update time) rather than absolute position information. The position control loop then compares the actual position of the motor (obtained from a feedback sensor) with a given position reference, and operates to cause the motor to "chase after" the position references until the final position is reached.

In addition to move commands, other types of commands are also available to users in multi-axis situations. For example, it is known to implement gear relationships and position cams in a sequential programming language environment. For example, a gear icon may be provided (or a pair of icons for starting and stopping) that allows a user to program a gear ratio between two motion control axes. When the user clicks on the gear icon, a dialog box appears that allows the user to program the parameters of the two-axis relationship. Typically, one motion control axis will be designated as the master axis, another motion control axis will be designated as the slave axis, and a gear relationship will be specified between the two axes. Additional slave axes may also be specified. Then, in operation, when the start-gear icon is encountered, the two motion control systems for the two motors will operate to electronically maintain the specified ratio between the two motion axes.

This arrangement has worked well in situations where the number of motion control axes is relatively small. When there are only a few motion control axes in the motion control system, it is not particularly difficult for the user to maintain an understanding of the relationships between the various motion control axes.

However, as industrial control systems have become more complex, this arrangement has been found to be unsatisfactory. In some systems, it is possible to have thirty-two or sixty-four motion control axes in a single industrial control system. In such situations, it is difficult for the user to maintain an understanding of the relationships between the various motion control axes due to the large number of axes in the industrial control system. The relationship between various motion control axes is not readily ascertainable with existing programming interfaces. For example, the gearing relationship between two axes is normally not displayed to the user unless the user clicks on the gear icon to bring up the dialog box that provides additional information. As the number of motion control axes increases, it becomes increasingly cumbersome to have to click on each individual icon to obtain additional information regarding the relationship of the various motion control axes. There is no way to simultaneously display information pertaining to the physical relationship between the various motion control axes in a single, coherent manner.

Additionally, a further complication arises where multiple industrial controllers are used in the motion control system and each industrial controller is individually programmed. For example, if multiple programmable logic controllers are used, and each programmable controller has its own user program with each user program controlling only a subset of the various motion control axes, then the physical interrelationship is not ascertainable from any given one of the user programs, regardless of how the information is displayed to the user.

Finally, this arrangement provides only limited flexibility and does not easily allow for complex relationships between motion control axes. In conventional systems that employ a sequential programming language, the number of motion commands that can be employed for any given axis is typically fixed at a small number of different types. The use of virtual axes in these systems provides additional flexibility, but is cumbersome and hampers the user's efforts to maintain an overall understanding of the physical system.

BRIEF SUMMARY OF THE INVENTION

The present invention overcomes the drawbacks of existing approaches. According to a first aspect of the invention, the invention provides a method of programming an industrial control system comprising connecting a first, second, and third icons with first and second data flow lines and displaying the connection of the first, second, and third icons with the first and second data flow lines to a user. The first icon represents a first motion control axis that includes a first controlled electric motor, the second icon represents a second motion control axis that includes a second controlled electric motor, and the third icon represents a physical relationship between the first motion control axis and the second motion control axis. The connecting and displaying steps (A) and (B) are performed by a programming interface in response to user inputs received at a human-machine interface.

Preferably, the first and second data flow lines represent the flow of position information between first and third icons and the third and second icons, respectively. The third icon may for example be a gear icon or a position cam icon. Preferably, all three icons are implemented as objects in an object-oriented programming environment.

The first and second motion control axes may be associated with two different industrial controllers that are connected to each other by a network communication link. In this event, the displaying steps are performed in a manner such that the use of the two different industrial controllers is transparent to the user.

According to another aspect of the invention, an industrial control system comprises a first motion control system including a first motor and a first motion controller, a second motion control system including a second motor and a second motion controller, and a user program. The user program is executable by the industrial control system to control the first and second motion control systems.

When the user program is displayed to a user, the user program comprises the following graphical elements. In particular, the user program includes a first icon which represents the first motion control system, a second icon which represents the second motion control system, and a third icon which represents a physical relationship between the first and second motion control systems. Finally, also displayed to the user is a plurality of data flow lines that connect the first, second, and third icons and that represent a flow of data between the icons. Again, the various icons are all preferably implemented in an object-oriented programming environment.

Advantageously, the programming interface according to the preferred embodiment of the invention explicitly indicates the physical relationship between the various motion control axes. The various motion control axes are represented by icons, and the icons are connected with connection lines that represent data flow between the motion control axes. Additional icons are provided that show relationships such as gearing, position cams, time cams, and so on. The programming interface is thus organized based on the physical relationship between the axes, and the physical relationships for the entire system are displayed to the user in a single workspace, without the user having to click on numerous icons.

Additionally, further advantages are provided where motion control axes are used that are connected to multiple industrial controllers. The preferred programming interface graphically provides the user with concise information regarding the physical relationships between various motion control axes throughout the entire industrial control system, even though some of the motion control axes are coupled to different industrial controllers. The programming interface makes it possible to display this information without cluttering the display with implementation details, such as those pertaining to the network and hardware implementation of the various motion control systems. The programming interface therefore facilitates programming at the system level.

Finally, the preferred programming interface is robust and readily allows users to define complex relationships between motion control axes. The programming interface allows numerous motion commands to be employed for each axis. The programming interface also lends to the utilization of new types of relationships including user-defined relationships.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
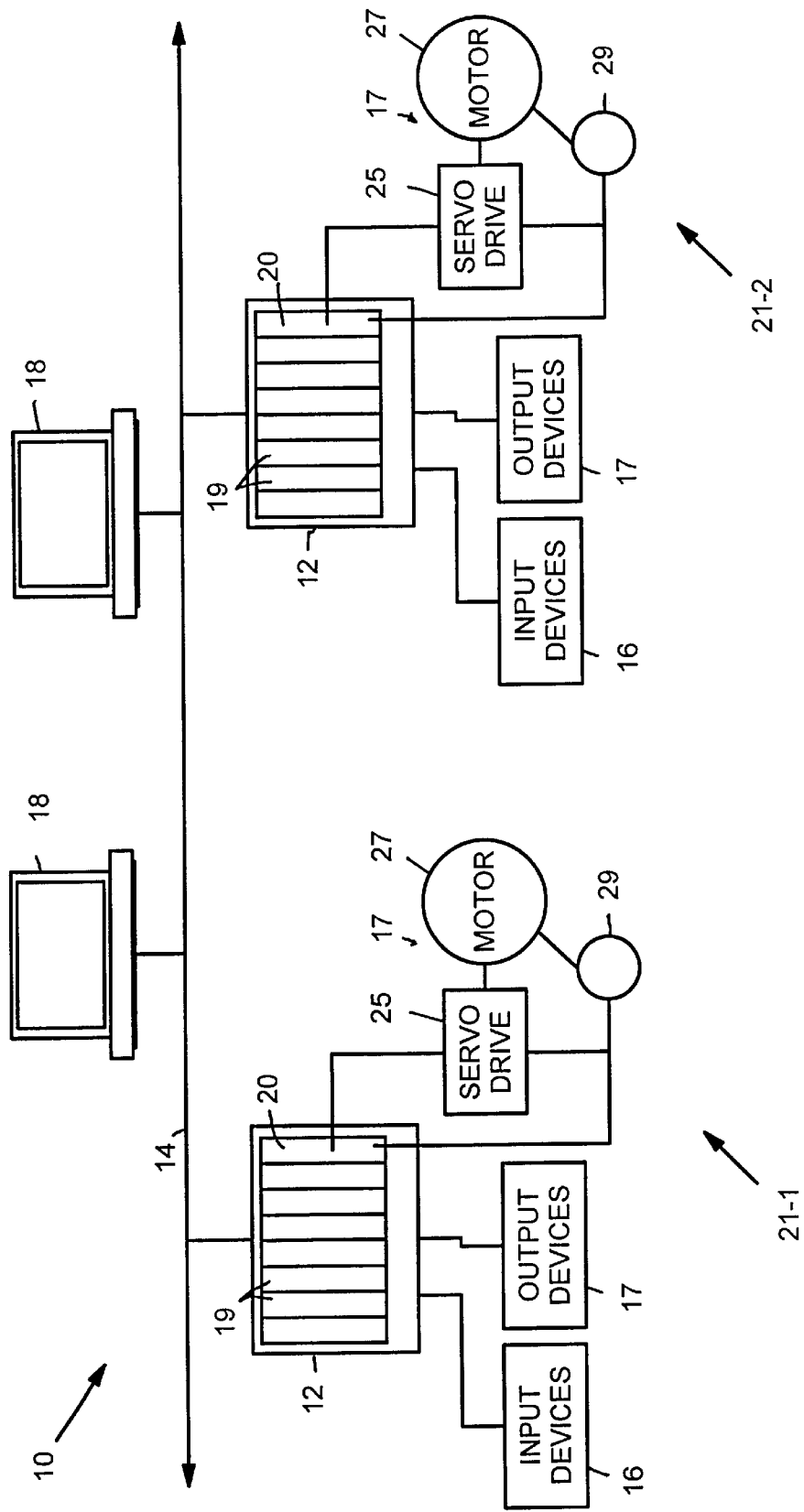
FIG. 1 illustrates an overview of an industrial control system that is programmed using a programming interface in accordance with a preferred embodiment of the invention.

Referring now to FIG. 1, FIG. 1 illustrates an overview of an industrial control system 10 that is programmed using a programming interface in accordance with a preferred embodiment of the invention. The industrial control system 10 comprises a plurality of industrial controllers such as programmable controller systems 12 that are interconnected by way of a communication network 14. The industrial control system 10 further includes a input devices 16 and a plurality of output devices 17, with the plurality of output devices 17 being controlled by the programmable controllers 12 in response to input status information from the input devices 16. A pair of monitors 18 are disposed on the communication network 14 and are used to monitor I/O status.

In FIG. 1, only two motion control axes are shown. For purposes of simplicity in describing the preferred programming interface, the exemplary industrial control system 10 of FIG. 1 has been made relatively simple, as have the exemplary user programs described below in conjunction with FIGS. 2 and 3. As will become apparent, however, the preferred programming interface can readily be applied to more complex industrial control systems with 32, 64, 128, or more motion control axes and with more complex user programs.

As is conventional, the programmable controllers 12 each comprise a plurality of modules 19, which are connected to each other by way of a common back plane. The programmable controllers 12 are rack-mounted units that include a plurality of slots, which are adapted to receive a plurality of modules. For each of the programmable controllers 12, one of the modules 19 is a motion control module 20 is used to implement a motion control system or axis 21-1, 21-2. The remaining modules 19 may include, for example, a processor module (for executing the user program), I/O interface modules (for interfacing with the input and output devices), and other specialized modules (e.g., for establishing an Ethernet link or connecting to other system hardware).

In addition to a motion control module 20, each motion control axis 21-1 and 21-2 further comprises a servo drive 25, a motor 27 and a feedback sensor 29. In combination, each respective motion controller 20 and servo drive 25 are capable of accepting a position command and in response generating current to drive the motor and thereby to control the respective motor 27 to obtain the commanded position.

The motion controller 20 and the servo drive 25 in combination implement inter alia a position control loop. Rather than providing the position control loop only with the final position, the position control loop is provided with a series of incremental position references, as is conventional. In practice, the position reference values are provided in the form of delta position information (change in position since the last update) rather than absolute position information. The incremental references are used throughout the move and are provided at a rate that is on the order of ones of milliseconds or tens of milliseconds. The position control loop then compares the actual position of the motor (obtained from a feedback sensor) with a given position reference, and operates to cause the motor to "chase after" the position references until the final position is reached.

Figure 2:
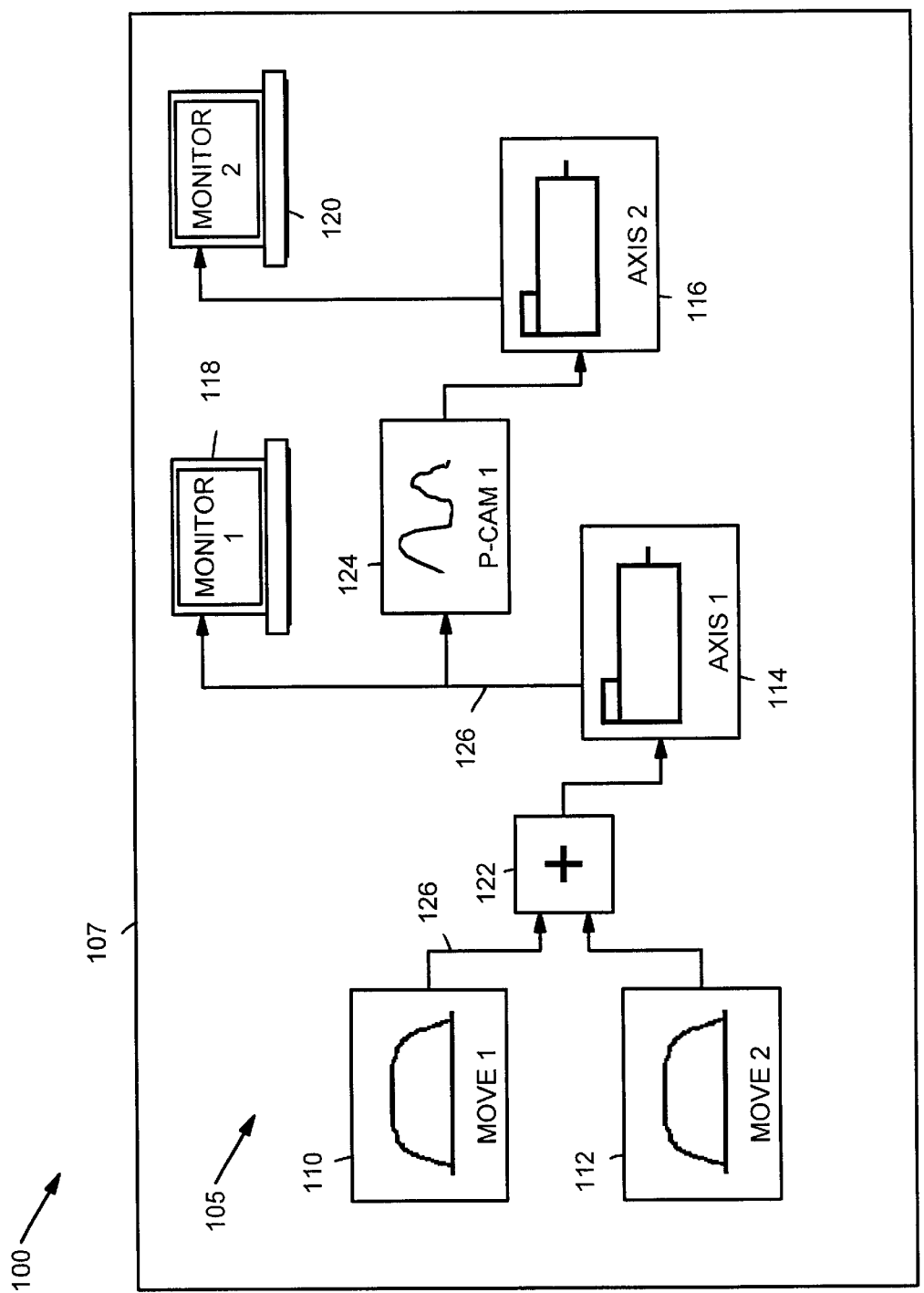
FIG. 2 illustrates a programming interface utilized to program the industrial control system of FIG. 1, in accordance with a preferred embodiment of the invention.
Figure 3:
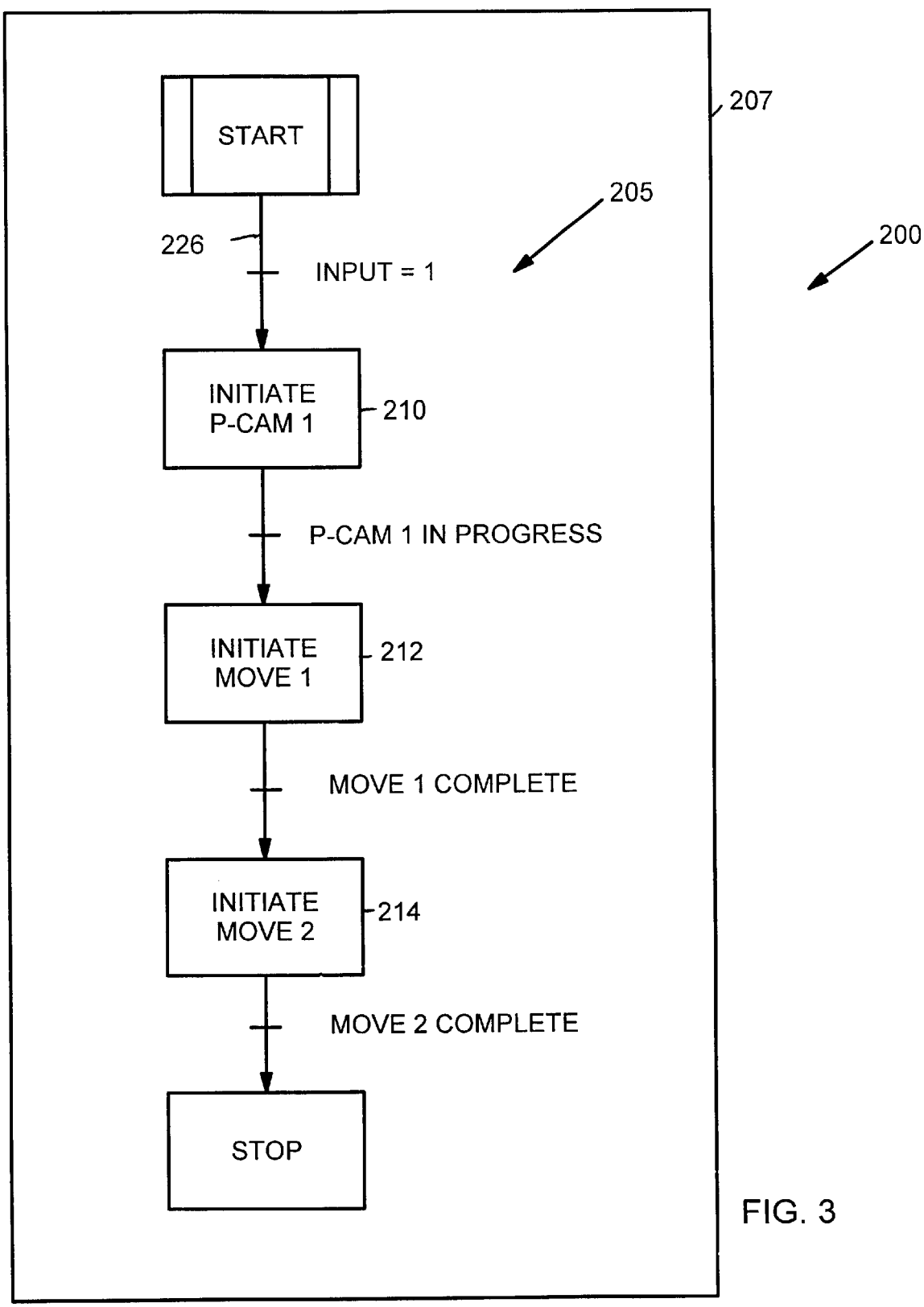
FIG. 3 illustrates a sequential programming interface that complements the programming interface of FIG. 2.

Referring now to FIGS. 2 and 3, FIG. 2 illustrates programming interface 100 used to create a user program 105. FIG. 3 illustrates a programming interface 200 that is used to create an additional user program 205. The programming interface 200 and the user program 205 complement the programming interface 100 and the user program 105 and, in practice, the user programs 105 and 205 may simply be different aspects of the same overall user program.

Referring first to FIG. 2, by way of overview, the preferred programming interface 100 comprises a plurality of icons 110–124 which are made available to the user in a workspace 107 and which are connected by a plurality of connection lines 126. The icons 114 and 116 represent motion control axes, the icons 110 and 112 represent motion commands, and the icon 124 and the associated connection lines 126 represent the physical relationship between the motion control axes 114 and 116. The number, type and interconnection of the icons 110–124 is determined by the user, who writes the user program via a suitable user interface such as a keyboard, mouse and monitor. The user is therefore able to write a user program and visually examine the manner in which the user program defines the physical relationship between the various motion control axes.

More specifically, the preferred programming interface 100 provides the user with a workspace 107 and makes available a plurality of icons that can be dragged into the workspace 107. The programming interface 100 may for example be implemented in a windows environment such as Windows NT® ("Windows NT" is a registered trademark of Microsoft Corporation). On one side of the screen is provided a palette of generic icons (not illustrated) which the user can click on to create a new instance of the chosen icon, which can then be dragged into the workspace.

As detailed below, the icons are preferably actually objects in an object-oriented programming environment. As a result, when the user clicks on a motion axis icon, for example, the programming interface 100 creates a new instance of a motion axis object. The palette of generic icons may include, for example, a motion axis icon, a trapezoidal move icon, a S-curve move icon, a time cam icon, a position cam icon, a gear icon, a monitor icon, an adder icon, a multiplier icon, a user function icon, an input icon, an output icon, a CNC node icon, and so on. The implementation of these objects using object-oriented techniques is described in greater detail below in conjunction with FIG. 5.

Figure 4:
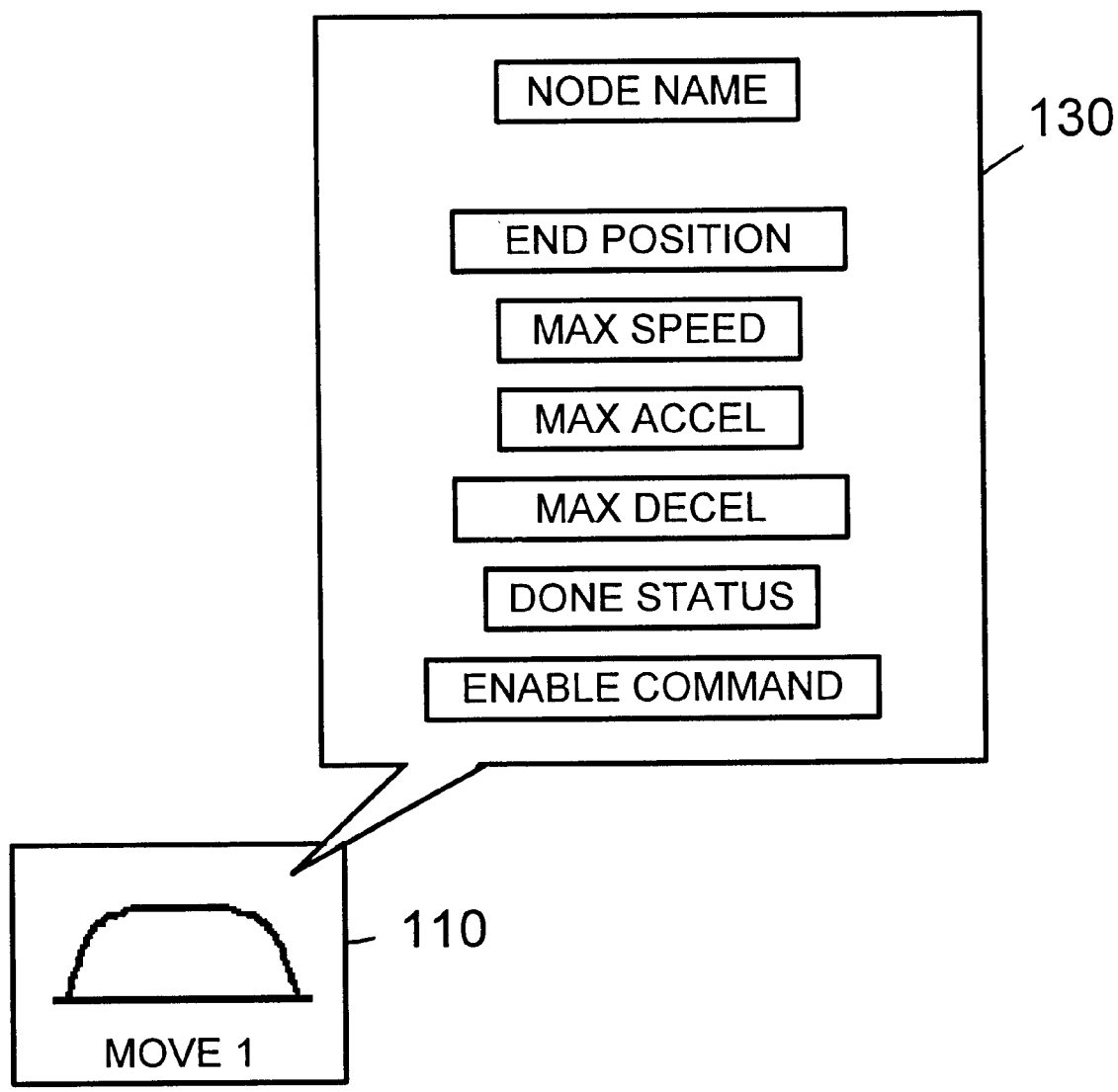
FIG. 4 illustrates the programming of an icon of FIG. 2 in greater detail.

For example, to create the move icon 110, the user clicks on a move icon on the palette of icons and drags the move icon to the left side of the screen to place the icon in its illustrated location. To program the icon, the user clicks on the icon, at which time a dialog box 130 appears, as shown in FIG. 4. The dialog box 130 allows the user to program specifics of the move, such as the end position, the maximum speed, the maximum acceleration, and the maximum deceleration. The dialog box also allows the user to give the move command a node name (e.g., "Move1"), as well as specify an enable command and a done status indicator. This makes it possible to refer to the move icon (and, more specifically, to utilize the move parameters defined by the move icon) in an associated sequential program, as detail below in conjunction with FIG. 4.

In the example of FIG. 2, the Move1 and Move2 icons 110 and 112 are graphically presented in a manner such that they show exactly the same velocity profile. Conceivably, it would also be possible to update the graph shown to the user on the move icons to take into account the specific parameters of the move as specified by the user. This approach is not preferred, however, because it requires larger icons in order for the specific information contained on the icon to be viewable, and therefore reduces the total number of icons that may be displayed on the screen at any one time.

It may be noted that in FIG. 2, the entire workspace 107 is viewable. Ordinarily, depending on the complexity of the industrial control system, it may be necessary to have the user scroll through the user program, such that the workspace is actually larger than what fits on the user's screen at one time. Encapsulation techniques could also be utilized.

After programming one icon, the user then clicks on another icon, such as a motion axis icon, and drags the motion axis icon into the workspace 107. The user can then click on the icon to bring up a dialog box to program the specifics the motion axis, such as the node name, the axis number, an enable command, a done status indicator, commands for other functions (e.g., homing commands, commands that permit testing to be performed, etc.), and so on. The dialog box is also used to associate the motion axis icon with a specific one of the motion control axes 21-1 and 21-2 in FIG. 1. For example, the Axis1 icon 114 may be defined to represent the motion control axis 21-1 in FIG. 1, and the Axis2 icon 116 may be defined to represent the motion control axis 21-2.

As more icons are created by the programming interface 100 in response to user operation of the keyboard and mouse, it will also become necessary to connect the icons with connection lines 126. Again, this is performed by the programming interface 100 in response to user operation of the keyboard and especially the mouse. This process continues until a complete user program has been written.

The user program of FIG. 2 includes first and second move icons 110 and 112, first and second motion control axis icons 114 and 116, first and second monitor icons 118 and 120, an adder icon 122, and a position cam icon 124. In the system defined by the user program of FIG. 2, the motion control axis 21-1, which is represented by the Axis1 icon 114, is set up to execute two move commands corresponding to the Move1 icon 110 and the Move2 icon 112. The two move commands may be executed simultaneously such that the two move commands are superimposed on each other as indicated by the adder icon 122. More likely, the conditions under which each move command is executed may be different, such that there are times when one move command is executed but not the other move command. When the motor 27 associated with the motion control axis 21-1 is driven, the associated sensor 29 obtains position information which is provided to a position cam (implemented in firmware/software) which is represented by the position cam icon 124. In operation, the position cam operates to control the motion axis 21-2 so as to maintain a positional or other physical relationship between the motion control axis 21-1 and the motion control axis 21-2. Thus, the physical relationship between the motion control axes 21-1 and 21-2 is readily apparent from the manner in which the position cam icon 124 and the Axis1 and Axis2 icons 114 and 116 are connected by the connection lines 126.

The manner in which data flows between the icons 110–124 in FIG. 2 can be better understood in reference to FIG. 3. Referring now to FIG. 3, FIG. 3 illustrates a sequential flow chart user program 205 that is written using a programming interface 200. The programming interface 200 and the user program 205 complement the programming interface 100 and the user program 105 and, as previously noted, the user programs 105 and 205 may simply be different aspects of the same overall user program.

The programming interface 200 comprises a plurality of icons including command icons 210–214. The icons are made available to the user in a workspace 207 and are connected by a plurality of connection lines 226. The connection lines 226 represent the temporal relationship between the icons in FIG. 3, as is typical in a sequential programming language. The number, type and interconnection of the icons is determined by the user. The programming interface 200 is similar to programming interfaces for conventional sequential programming languages for motion control systems, except that information that pertains to the physical relationship between motion control axes is programmed via the programming interface 100 and not the programming interface 200. Additionally, instead of using a graphics-based programming language, such as sequential flow chart or ladder logic languages, another language such as C++ could also be used. As is typical in Windows, the user may be given the option to view both workspaces simultaneously (e.g., in a "tiled" format), or to alternate between the two workspaces.

From the user standpoint, the programs 105 and 205 cooperate to represent the operation of the system 10 as follows. The program 205 defines sequential operation of the industrial control system 10. The program 205 starts with the execution of the Initiate P-Cam1 command 210 when an input is received, followed by the execution of the Initiate Move1 command 212. The Move1 command 212 in FIG. 3 corresponds to the Move1 icon 110 in FIG. 2. In practice, this correspondence can be programmed by having the user specify a command name in the dialog box for the Move1 icon 110 (e.g., "Move1_EN"). When the user programs the Move1 command 212, the user then invokes the command name that was specified in the dialog box for the Move1 icon 110. Likewise, in a C++ program, the name for the command to initiate Move1 would the command name specified in the dialog box for the Move1 icon 110.

From the user's perspective, the initiation of the Move1 command in FIG. 1 causes the Move1 icon 110 in FIG. 2 to begin outputting position references. Of course, the icon 110 is itself just a graphical construct, but conceptually at least the user's perspective is correct.

The position references output by the Move1 icon 110 are incremental position references that are provided to the position control loop for the motion control axis 21-1. Although the user specifies a final position when programming the Move1 icon 110, the position control loop is provided with incremental position reference values to control the motor to obtain the commanded position. In practice, the position reference values may be provided every few milliseconds or so in the form of delta position information (change in position since the last update time) rather than absolute position information. The position control loop then compares the actual position of the motor (obtained from a feedback sensor) with a given position reference, and operates to cause the motor to "chase after" the position references until the final position is reached. A preferred method and system that can be used to generate position references in the described manner is disclosed in my copending application entitled "Method and Apparatus for Generating Reference Values for a Motion Control Loop in an Industrial Control System.," filed concurrently herewith. The contents of this application are hereby expressly incorporated by reference.

The delta position value from the Move1 icon 110 is provided to the adder icon 122. Initially, the Initiate Move2 command 214 has not been initiated, so the delta position value from the Move1 icon 110 is not added to anything before being provided to the Axis1 icon 114. In response to the delta position values from the Move1 command 212, the motion controller 20 for the motion control axis 21-1 controls the associated motor 27 to move towards the commanded position. Simultaneously, position information from the sensor 29 is provided to the monitor icon 118 and to the position cam icon 124. The monitor icon 118 represents, for example, the monitor 18 in FIG. 1. The monitor 18 can therefore be used to provide information regarding the position of the shaft of the motor 27, for example, by displaying a graph showing position versus time. The position cam icon 124 has been initiated, therefore, the shaft of the motor 27 of the motion control axis 21-2 is controlled so as to maintain a predetermined positional relationship (defined by the manner in which the P-Cam1 icon 124 has been programmed) relative to the shaft of the motor 27 of the motion control axis 21-1.

In the illustrated embodiment, the motion control axis 21-2 is controlled as a function of the actual position of the motor 27 of the motion control axis 21-1, as indicated by the sensor 29 for the motion control axis 21-1. However, the motion control axis 21-2 could also be controlled as a function of the commanded position of the motor 27 for the motion control axis 21-1, as indicated by the position reference values from the adder icon 122. The connection lines in this case may be partially overlapping, in generally the same manner as is shown for the connection line that connects the Axis1 icon 114 and the monitor icon 118, and the connection line that connects the Axis1 icon 114 and the P-Cam1 icon 124.

The data flow just described is updated every few milliseconds in ongoing fashion. Thus, at each update, a new delta position value is transmitted from the Move1 icon 110 and, if applicable, from the Move2 icon 112 to the adder icon 122. Further, new delta position information is provided by the motion axis icon 114 to the monitor icon 118 and the position cam 124, and so on. In order to ensure that the icons are updated in the correct order (to prevent, for example, the adder icon 112 being updated before the Move1 or Move2 icons 110 and 112), a linked list may be used in which each icon is provided with a pointer that points to the next icon to be updated.

Referring again to FIG. 3, when execution of the Move1 command 212 is complete, the Move2 command 214 is initiated. Accordingly, the Move2 icon 112 then starts generating delta position values. In this embodiment, the Axis1 icon receives delta position values from either the Move1 icon 110 or the Move2 icon 112, because the Move1 and Move2 commands are not executed simultaneously. However, if the Move1 and Move2 commands are executed simultaneously, then each delta position values from the Move1 icon is added to a delta position value from the Move2 icon, such that the motion control axis 21-1 is provided with a move command that is the superposition of the parameters specified by the Move1 icon 110 and the parameters specified by the Move2 icon 112.

As previously noted, the icons in the programming interface 100 are preferably objects in an object-oriented programming environment. The use of object-oriented programming techniques is preferred because additional functionality (e.g., different types of axis relationships) can be defined simply by defining new types of objects; thus, increased flexibility is achieved. An overview of an exemplary set of class relationships for a set of objects that can be used to implement the programming interface 100 is shown in FIG. 5.

Figure 5:
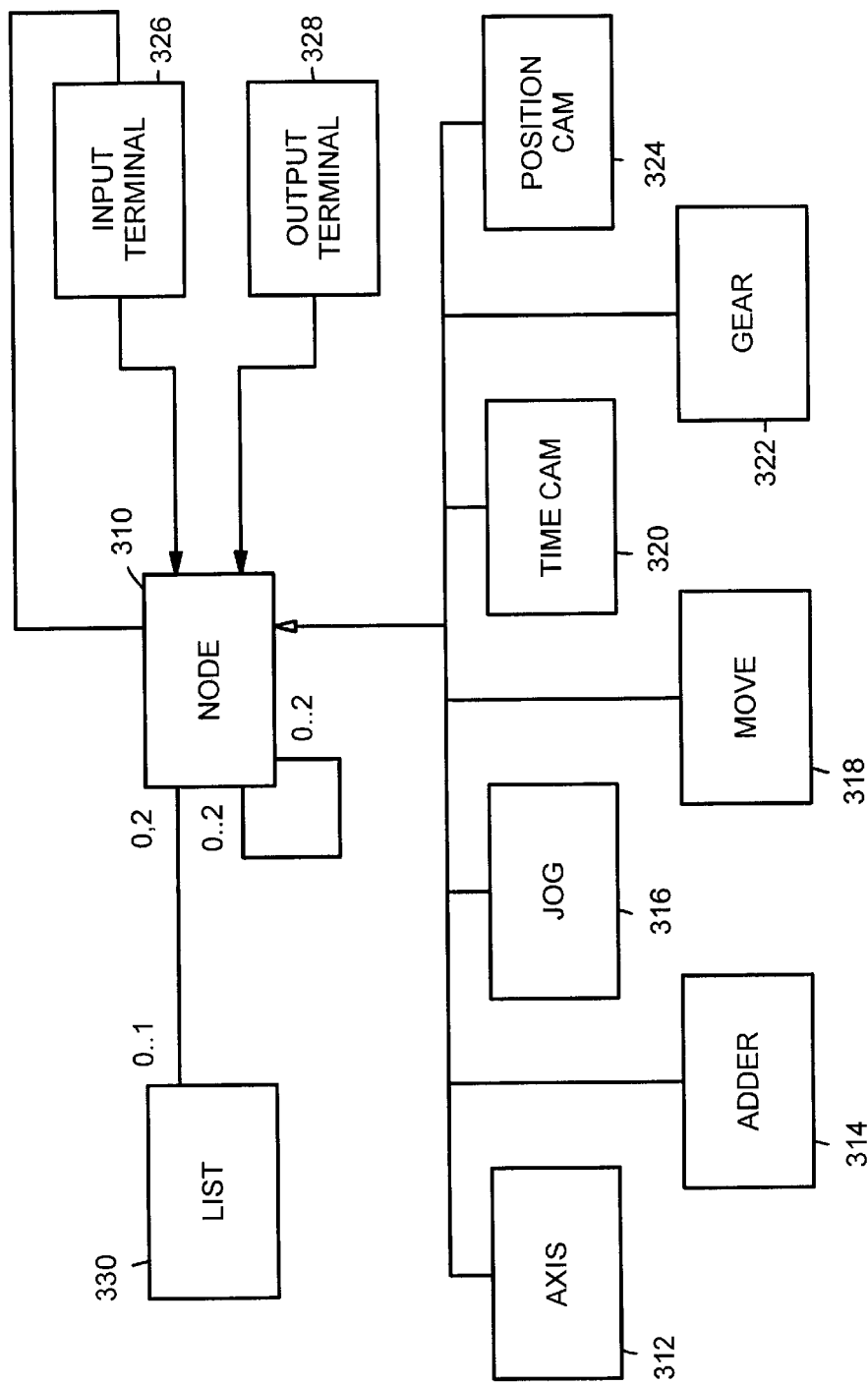
FIG. 5 illustrates an exemplary set of class relationships for objects usable to implement the programming interface of FIG. 2 in an object-oriented programming environment.

Referring now to FIG. 5, the base class is the node 310. Each node has a node type and a node number. Instances of the node object include an axis object 312, an adder object 314, a jog object 316, a move object 318, a time cam object 320, a gear object 322 and a position cam object 324. Each node includes one or more input terminal objects 326 and one or more output terminal objects 328. Typically, the input terminal of one node is connected to the output terminal of another node.

The group of objects for a user program has associated therewith a list object 330, which maintains two linked lists. The first linked list is a list of all nodes that are connected to the motion axes in the group of objects that form the user program. The other linked list is determined by the connections between the nodes in the user program, and defines the update order as previously discussed.

As previously noted, in the programming interface 100, when the user clicks on a motion axis icon, for example, the programming interface 100 creates a new instance of the motion axis object 312. The new instance then assumes all of the attributes associated with this class of objects, as is typical in an object-oriented programming environment.

The physical relationships that can be achieved by using the above-mentioned objects (or non-object oriented programming icons) will now be described. The jog object 316 allows a jog to be defined for a motion control axis. A jog is a motion profile in which the user specifies an end velocity instead of an end position. A jog can be either an S-curve jog, meaning that a continuous acceleration profile is required, or a trapezoidal jog, meaning that a continuous acceleration profile is not required.

The move object 318 allows a move to be defined for a motion control axis. A move is a motion profile in which the user specifies an end position. Again, a move can be either an S-curve move, meaning that a continuous acceleration profile is required, or a trapezoidal move, meaning that a continuous acceleration profile is not required.

The time cam object 320 allows the desired motor shaft position to be specified as a function of time. The user may be allowed to specify an equation that describes position as a function of time, or may be allowed to specify a series of points using a time cam editor, in which case a linear or cubic spline interpolation could be used to generate a suitable set of equations based on the user's series of points.

The gear object 322 allows a gear ratio to be specified between first and second axes. Thus, the gear object may be used to define a master and slave axis with a 4:1 gear ratio, so that the slave axis moves four times faster than the master axis.

The position cam object 324 allows the desired motor shaft position to be specified as a function of the position of another motor shaft. This is similar to a gear relationship except that the relationship is not a simple ratio. The user may be allowed to specify an equation that describes slave position as a function of master position, or may be allowed to specify a series of points using a position cam editor, in which case a linear or cubic spline interpolation could be used to generate a suitable set of equations based on the user's series of points.

The adder object 312 allows the outputs of any of the other above-mentioned types of objects to be added together. For additional flexibility, in addition to an adder object, other mathematical objects may be defined, such as a multiplier object or, more generally, a user equation object.

The set of objects shown in FIG. 5 is exemplary. From FIG. 5, it should be apparent that the functionality that can be offered to the user can be easily extended by adding additional types of objects. Indeed, as previously noted, the use of object-oriented programming techniques is preferred because additional functionality (e.g., different types of axis relationships) can be defined simply by defining new types of objects; thus, increased flexibility is achieved.

Figure 6:
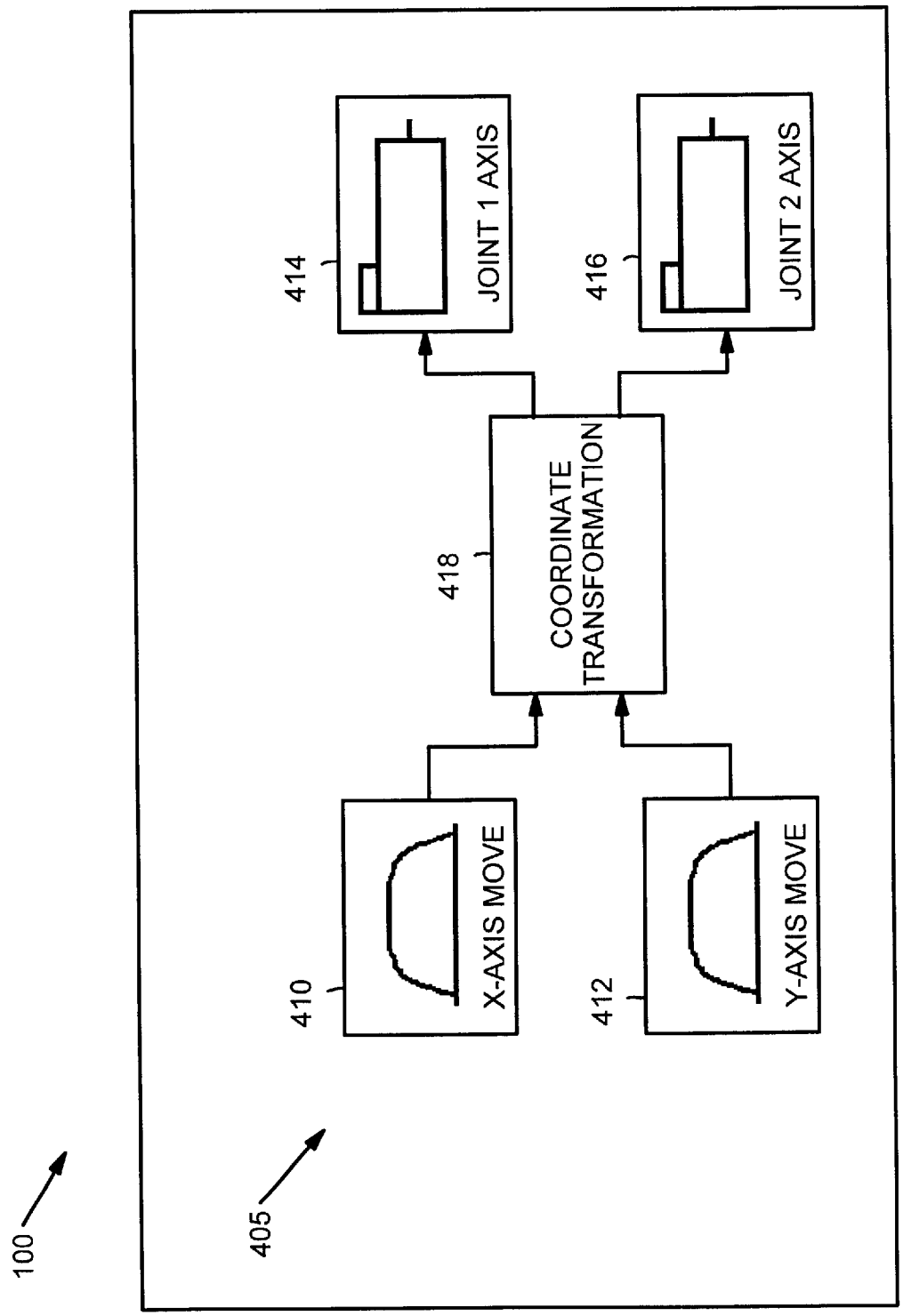
FIG. 6 illustrates a coordinate transformation object usable in connection with the programming interface of FIG. 2.

For example, as shown in FIG. 6, a coordinate transformation object 418 is defined that is usable, for example, in robotics applications in which a robotics arm is provided with a "shoulder" axis and an "elbow" axis. In this case, the user is allowed to specify moves in an X-Y coordinate system, for example using move icons 410 and 412, and the coordinate transformation object 418 performs the necessary coordinate transformation to first and second joint axes 414 and 416 as a function of the parameters specified by the X-Y move icons 410 and 412.

Figure 7:
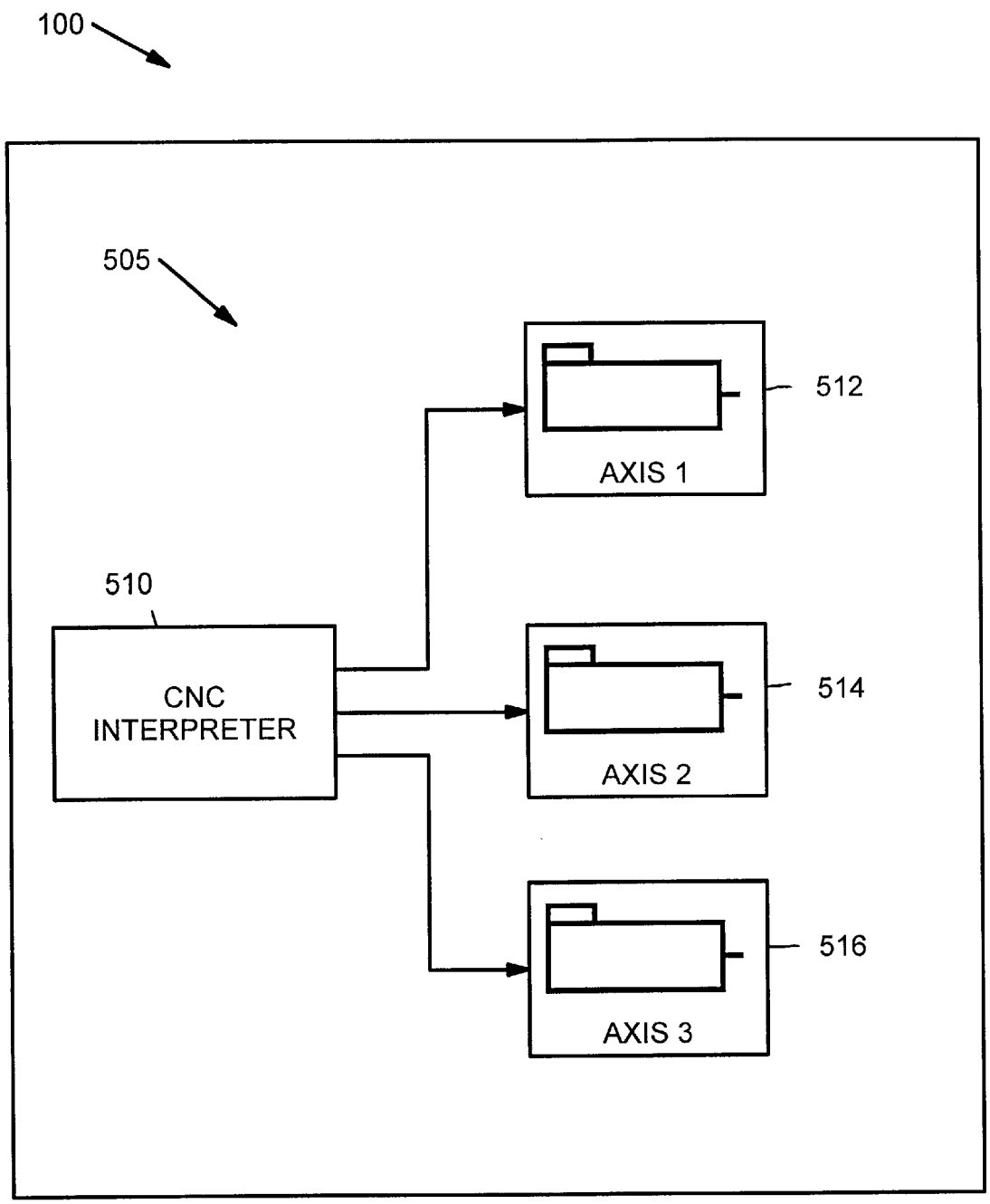
FIG. 7 illustrates a CNC interpreter object usable in connection with the programming interface of FIG. 2.

As another example, shown in FIG. 7, a CNC interpreter object 510 may be provided that allows users to program the object using a CNC (computer numerical control) programming language. The interpreter object may then have three outputs for different motion control axes 512, 514 and 516 that are controlled on the basis of the CNC program. Additionally, a simulator object may be provided that allows a user to simulate mechanical element in the controlled system based on known inputs to the mechanical element and based on known dynamic properties of the mechanical element. Numerous other possibilities can also be envisioned. While the use of object-oriented programming techniques facilitates providing icons with more complex functionality (because of the robustness of object oriented programming), it should also be noted that these icons could also be provided without using object-oriented programming techniques.

Advantageously, the programming interface according to the preferred embodiment of the invention explicitly indicates the physical relationship between the various motion control axes. The various motion control axes are represented by icons, and the icons are connected with connection lines that represent data flow between the motion control axes. Additional icons are provided that show relationships such as gearing, position cams, time cams, and so on. The programming interface is thus organized based on the physical relationship between the axes, and the physical relationships for the entire system are displayed to the user in a single workspace, without the user having to click on numerous icons.

Additionally, further advantages are provided where motion control axes are used that are connected to multiple industrial controllers. The preferred programming interface graphically provides the user with concise information regarding the physical relationships between various motion control axes throughout the entire industrial control system, even though some of the motion control axes are coupled to different industrial controllers. The programming interface makes it possible to display this information without cluttering the display with implementation details, such as those pertaining to the network and hardware implementation of the various motion control systems. The programming interface therefore facilitates programming at the system level.

Finally, the preferred programming interface is robust and readily allows users to define complex relationships between motion control axes. The programming interface allows numerous motion commands to be employed for each axis. The programming interface also lends to the utilization of new types of relationships including user-defined relationships.

Many other changes and modifications may be made to the present invention without departing from the spirit thereof. The scope of these and other changes will become apparent from the appended claims.

I claim:

1. A method of programming an industrial control system, comprising:
   (A) connecting a first, second, and third icons with first and second data flow lines, the first icon representing a first motion control axis that includes a first controlled electric motor, the second icon representing a second motion control axis that includes a second controlled electric motor, and the third icon representing a physical relationship between the first motion control axis and the second motion control axis; and
   (B) displaying the connection of the first, second, and third icons with the first and second data flow lines to a user; and
   wherein the connecting and displaying steps (A) and (B) are performed by a programming interface in response to user inputs received at a human-machine interface.

2. A method according to claim 1, wherein the first and second data flow lines represent the flow of position information between first and third icons and the third and second icons, respectively.

3. A method according to claim 2, wherein the position information is incremental position information.

4. A method according to claim 1, wherein the third icon at least partially defines a relationship that specifies a position of a motor shaft of the second motion control axis relative to a position of a motor shaft of the first motion control axis.

5. A method according to claim 1, wherein the third icon is a member selected from the group consisting of a gear icon and a position cam icon.

6. A method according to claim 1, further comprising connecting a fourth icon to the first icon with a third data flow line, the fourth icon being a motion icon pertaining to a motion command, and the third data flow line representing the flow of incremental position reference values from the motion icon to the first icon.

7. A method according to claim 6, wherein the motion icon is a first motion icon, wherein the fourth data flow line terminates at a fifth icon which is an adder icon, such that the motion icon is connected to the first icon by way of the adder icon, and further comprising connecting a sixth icon which is a second motion icon to the adder icon by way of a fifth data flow line, and wherein the adder icon superimposes the outputs of the first and second motion icons.

8. A method according to claim 1, wherein the first and second motion control axes are associated with two different industrial controllers that are connected to each other by a network communication link, and wherein the displaying step is performed in a manner such that the use of the two different industrial controllers is transparent to the user.

9. A method according to claim 1, wherein the first, second, and third icons are implemented as objects in an object-oriented programming environment.

10. An industrial control system comprising:
    (A) a first motion control system including a first motor and a first motion controller;
    (B) a second motion control system including a second motor and a second motion controller; and
    (C) a user program, the user program being executable by the industrial control system to control the first and second motion control systems, and the user program when displayed to a user comprising the following graphical elements
    (1) a first icon, the first icon representing the first motion control system,
    (2) a second icon, the second icon representing the second motion control system, (3) a third icon, the third icon representing a physical relationship between the first and second motion control systems, and (4) a plurality of data flow lines that connect the first, second, and third icons and that represent a flow of data between the icons.

11. An industrial control system according to claim 10, wherein the industrial control system comprises first and second industrial controllers that are coupled to each other by way of a network communication link, and wherein the first industrial controller is coupled to the first motion controller and the second industrial controller is coupled to the second motion controller.

12. An industrial control system according to claim 11, wherein the user program is displayed in a manner that is free of any indication of the interposition of the first and second industrial controllers and the network communication link between the first and second motion controllers.

13. An industrial control system according to claim 10, wherein the plurality of data flow lines represent the flow of position information between the first, second, and third icons.

14. An industrial control system according to claim 13, wherein the position information is incremental position information.

15. An industrial control system according to claim 10, wherein the third icon at least partially defines a relationship that specifies a position of a motor shaft of the second motion control axis relative to a position of a motor shaft of the first motion control axis.

16. An industrial control system according to claim 10, further comprising first and second motion icons and an adder icon, the first and second motion icons being connected to inputs of the adder icon by first and second additional data flow lines, and the output of the adder icon being connected to an input of the first icon by a third additional data flow line.

17. An industrial control system according to claim 10, wherein the first, second, and third icons are implemented as objects in an object-oriented programming environment.

18. An industrial control system according to claim 10, wherein the third icon is a member selected from the group consisting of a position cam icon and a gear icon.

19. An industrial control system according to claim 10, further comprising a fourth icon that provides an input to the first icon, and wherein the fourth icon is a member selected from the group consisting of a move icon, a jog icon, and a time cam icon.

20. A programming interface for an industrial control system comprising:

(A) a first object, the first object being an axis object, the first object being capable of having multiple instances thereof created each of which represents a motion control axis that includes a controlled electric motor; and (B) a second object, the second object being capable of having multiple instances thereof created each of which defines a physical relationship between motion control axes represented by respective ones of the multiple instances of the first object.

21. A method of programming an industrial control system, comprising:

(A) connecting first and second icons with a data flow line, the first icon representing a motion control axis that includes a controlled electric motor; and the data flow line representing the flow of a command reference value to the first icon;

(B) displaying the connection of the first and second icons with the data flow line to a user; and wherein the connecting and displaying steps (A) and (B) are performed by a programming interface in response to user inputs received at a human-machine interface.

22. A method according to claim 21, wherein the motion control axis is a first motion control axis, wherein the motor is a first motor, wherein the second icon is a coordinate transformation icon, wherein the first icon is a first motion control axis icon and is connected to a first output of the coordinate transformation icon, and wherein the method further comprises (1) connecting a first motion icon to a first input of the coordinate transformation icon with a second data flow line, (2) connecting a second motion icon to a second input of the coordinate transformation icon with a third data flow line, (3) connecting a second motion control axis icon to a second output of the coordinate transformation icon with a fourth data flow line, the second motion control axis icon representing a second motion control axis that includes a second controlled electric motor; and (4) displaying the connection of the first and second motion icons, the coordinate transformation icon, and the first and second motion control axis icons with the first, second, third, and fourth data flow lines to a user; and wherein the first, second, third, and fourth data flow lines all represent the flow of command reference values;

wherein the coordinate transformation icon represents a coordinate transformation that is performed between the command reference values received from the first and second motion icons and the command reference values provided to the first and second motion control axes; and wherein the connecting and displaying steps (1)–(4) are performed by a programming interface in response to user inputs received at a human-machine interface.

23. A method according to claim 21, wherein the motion control axis is a first motion control axis, wherein the motor is a first motor, wherein the second icon is a CNC interpreter icon, wherein the first icon is a first motion control axis icon and is connected to a first output of the CNC interpreter icon, and wherein the method further comprises (1) connecting a second motion control axis icon to a second output of the CNC interpreter icon with a second data flow line, the second motion control axis icon representing a second motion control axis that includes a second controlled electric motor; and (2) displaying the connection of the CNC interpreter icon to the first and second motion control axis icons with the first and second data flow lines to a user; and wherein the first and second data flow lines all represent the flow of command reference values from the CNC interpreter icon to the first and second motion control axis icons;

wherein the CNC interpreter icon is capable of being programmed in a CNC programming language, and interpreting the CNC program thereby created to control the first and second motion control axes; and wherein the connecting and displaying steps (1) and (2) are performed by a programming interface in response to user inputs received at a human-machine interface.

24. A method according to claim 21, wherein the second icon is a member selected from the group consisting of a move icon, a jog icon, and a time cam icon.

* * * * *